United States Patent Office 3,355,661
Patented Nov. 28, 1967

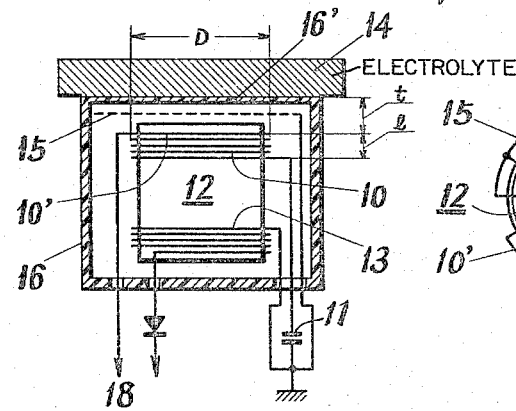
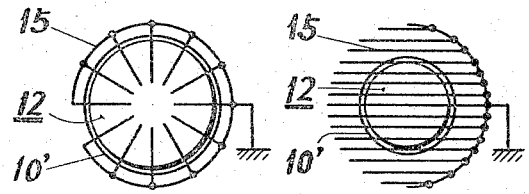
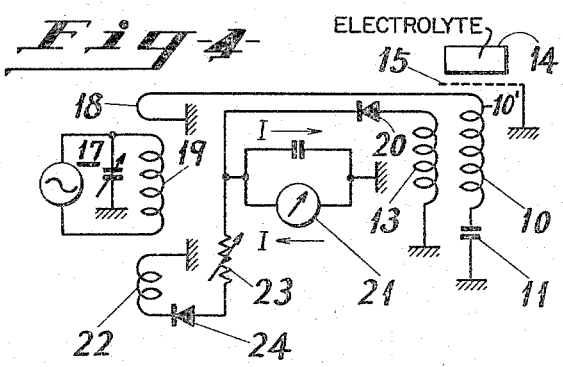
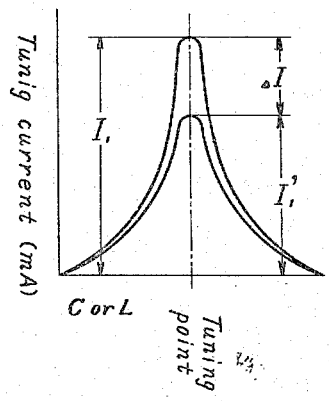
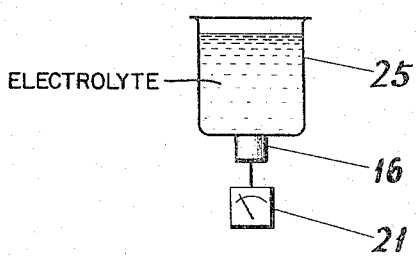
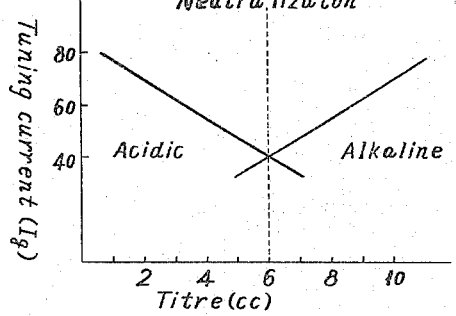
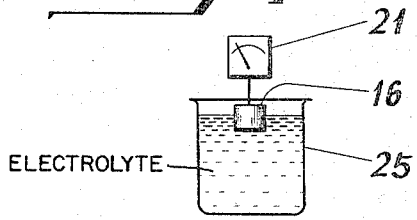

3,355,661
APPARATUS FOR MEASURING THE CONDUCTIVITY OF ELECTROLYTE
Kinzo Nonaka, Hamamatsu-shi, Japan, assignor to Seizo Kuwabara, Tajimi-shi, Japan
Filed Mar. 31, 1964, Ser. No. 356,157
3 Claims. (Cl. 324—30)

ABSTRACT OF THE DISCLOSURE

An apparatus for identifying a substance by measuring its conductivity. The apparatus consists of an inductance coil positioned with one end thereof facing the substance being studied. An electrostatic shield is interposed between the coil end and the substance so as to couple the inductance coil and the substance only by the magnetic flux set up in the coil by supplying a high frequency current thereto. The conductivity of the substance is measured by observing the apparent change in an electrical parameter caused by the power loss in the inductance coil.

This invention relates to a method and apparatus for measuring the conductivity of an electrolyte without the use of electrodes. More specifically, the invention relates to the provision of a new and improved instrument for directly reading the concentration of an electrolyte.

Hitherto several devices and systems have been suggested for measuring the conductivity of an electrolyte. A device has consisted in employing two insulated coils with toroidal cores arranged in coaxial and predetermined spaced relation and immersed within an electrolyte in which an alternating current is caused to flow through the conducting path linking one of the coils in response to an alternating field set up by the other coil when an alternating power source is applied thereto. The alternating current within the electrolyte sets up an alternating field in the core of the former coil which causes a voltage to be generated therein in proportion to the conductivity of the electrolyte.

Another method has proposed to measure the conductivity of an electrolyte by linking two coils by the electrolyte itself in such manner that the electrolyte acts as the core for the both coils.

Various solutions which have been suggested hitherto for measuring the conductivity of an electrolyte, have not been altogether satisfactory under the condition of service by reason of certain detrimental characteristics which are inherent in the system employing these coils which are linked by the electrolyte to be measured the conductivity thereof. That is to say, the electrolyte must be passed through the coils. So, it is difficult to apply such system for measuring the conductivity of refractory material. The measuring coils must be carefully protected from a corrosive substance. Moreover, such devices and systems do not work well for an electrolyte of lower density.

One phase of this invention is based on the discovery that when a high-frequency electric current is applied to a tuning circuit and when a conductive substance is placed near an end of the inductance coil in the tuning circuit, the alternating magnetic flux set up by the high-frequency electric current induces an eddy current in the substance, resulting in the decrease of inductance and the increase of resistance in the coil. This phenomenon is observed regardless of the state of the substance whether it is a liquid or a metal. In the case of liquid, however, its resistance is much higher than that of metal. Since the alternating magnetic flux such as of megacycle figures extends deep in the conductive liquid, the eddy current widely distributes therein. Therefore, the coil suffers substantially no change in its inductance, but only the resistance of the coil is increased resulting from the eddy current loss in the substance. It means that the concentration of an electrolyte may be measured as the change of resistance in the coil.

I have even demonstrated a device constructed according to the above discovery. But the device has a disadvantage in that the measurement must be performed with complicated systems for correcting the effect of the capacitance between the coil and the substance.

The present invention possesses all of the advantages of the prior art devices and none of the foregoing disadvantages. The present invention includes an arrangement in which an inductance coil is employed to measure the conductivity of a conductive substance by measuring the resistance in the coil when a high-frequency electric current is applied to the coil and when the coil is placed near the substance (not immersed within an electrolyte). In accordance with the present invention, the effect of the capacitance between the coil and the substance is nulled by an electric field-shielding element.

The present invention is suitable for use with a direct reading type of system. The subject invention is well adapted for a variety of uses and is particularly adapted for use in measuring the concentration of an electrolyte from the outside of the container for the electrolyte. The apparatus may be applied to the measurement of conductivity of water, oils, muds, sands, sludges and solid materials.

Another object of the invention is to provide a new and improved apparatus for measuring the conductivity of a conductive substance which utilizes an inductance coil energized by a high-frequency alternating power source to set up an alternating magnetic flux which induces an eddy current in the substance when the coil is placed near the substance and in which an electric field-shielding element is interposed between the inductance coil and the substance to be measured so that no capacitive effect is given to the measurement result.

The features of the invention together with the objects and advantages thereof will best be understood by reference to the following description taken in connection with the accompanying drawing in which:

FIG. 1 is a diagrammatic view of means for detecting the presence of an electrical conductive substance, which is used as a detector head in the apparatus of the invention;

FIG. 2 is a schematic plan view of the electric field-shielding element;

FIG. 3 shows a modification of the electric field-shielding element;

FIG. 4 is the circuitry of a preferred embodiment of the apparatus;

FIG. 5 shows the variation of a tuning current as the concentration of an electrolyte changes for various conductivity thereof;

FIGS. 6 and 7 show two manners to use the apparatus; and

FIG. 8 shows the titre diagram for neutralization titration as an application of the apparatus.

Referring now to the accompanying drawing, the detector means of the present invention consists of a solenoid coil 10 and a condenser 11 for forming a serial L-C tuning circuit connected to a high-frequency oscillator. The solenoid coil 10, hereinafter referred to as a detector coil, is wound around a magnetic core 12. The core 12 is also wound with another solenoid coil 13 which is hereinafter referred to as a pickup coil. The coil end 10' of the detector coil 10 opposite to the condenser 11 is faced to the substance 14, hereinafter referred to as a sample, to be measured as to its conductivity. Interposed between the coil end 10' and the sample 14 is an electric field-shielding element 15. This shield 15 is made of a number of conductive wires of which one end grounded and the other end opened so as not to form a closed circuit, as shown in FIGS. 2 and 3.

The shield 15 must be formed in such manner that the shield-forming wires extend at right angles to the axis of the coil 10. The arrangement must be such that the alternating magnetic flux set up by the coil 10 is capable of extending to the sample 14, but the capacitive coupling therebetween is broken by the shield 15. Hence the sample 14 and the coil 10 are coupled by the magnetic flux only which is set up by the coil 10 when a high-frequency power source is applied thereto.

The detector coil 10 is hermetically sealed up, together with the pickup coil 13 and the shield 15, within an insulating body so as to form a detector head 16. The wall portion 16' of the head 16 which faces to the sample 14, is made as thin as possible for the following reason: The resistance in the coil 10 depends upon a coefficient of coupling that is decided by the factors comprising the diameter (D) and length (l) of the coil 10 and the distance (t) between the coil 10 and the sample 14. That is to say, the shorter the distance (t) decreases or the greater the value (D/l) increases, the more the coefficient of coupling increases.

In case that the sample 14 is liquid, or an electrolyte, there is substantially no change in the inductance of the coil 10, but the resistance of the coil 10 undergoes a change resulting from the eddy current which is induced in the electrolyte in proportion to the conductivity thereof. And, the electric field has no capacitive effect on the coil 10, since the grounded shield 15 intervenes between the coil 10 and the electrolyte 14. In this connection, the coil end 10' which faces to the electrolyte 14, is preferably grounded.

The above arrangement means that, when the sample 14 is an electrolyte of which conductivity is relatively low, the tuning point of this serial L-C tuning circuit remains substantially at a fixed point. Therefore, the conductivity of the electrolyte can be directly read as the increase or decrease of the tuning current.

FIG. 4 illustrates a practical circuit of the apparatus of the invention. The detector coil 10 which forms a serial L-C tuning circuit together with a condenser 11, is arranged to face its grounded coil end 10' to the sample 14. The electric field-shield 15 is interposed between the detector coil 10 and the sample 14 as mentioned above. In order to tune this L-C circuit, by loose coupling, in a high-frequency oscillator 17, a part of the coil 10 is coupled electromagnetically or capacitively with the tank circuit of the oscillator 17. In FIG. 4, there is illustrated an example of electromagnetical coupling at 18 with the coil 19 of the said tank circuit.

In operation of this apparatus, firstly the frequency (f) of the oscillator 17 is decided as $$(2\pi f)^2 LC = 1$$

where L is the inductance of the coil 10, and C is the capacity of the condenser 11. The electric current which flows through the coil 10, is detected and picked up by the pickup coil 13 as explained above. This pickup electric current ($I_1$) is rectified by a rectifier 20 and is fed to an ampere meter 21. While, by using another pickup coil 22 and a variable resistor 23, the same magnitude of electric current ($I_2$) is picked up from the coil 19 of the oscillator 17. This electric current ($I_2$) is supplied to the ampere meter 21 through a rectifier 24. Then, the meter 21 indicates normally the point zero by these same magnitude but inverse currents $I_1$, $I_2$.

In the above-mentioned condition, when the detector coil 10 is placed near the sample (liquid) 14, the resistance of the coil 10 increases in proportion to the conductivity of the liquid sample. Then the tuning current $I_1$ changes to $I_1'$. This change appears in the meter 21 in accordance with the equation $$I_1 - I_1' = I_2 - I_1 = \Delta I$$

The value $\Delta I$ shows the conductivity of the sample 14, that is to say, it indicates the electric current in proportion to the concentration of the electrolyte.

The table A which follows gives results obtained by using the above illustrated apparatus for measuring three samples, i.e. 5.7 normality of chloric acid, 0.11 normality of chloric acid and distilled water. In the detector means of the apparatus, the detector coil 10 was 30 mm. in diameter and 10 mm. in length and the distance between the coil end 10' and the samples was 3 mm.

TABLE A

| Sample | Tuning current (μa.) | Capacitance for adjusting tuning (pf.) |
| --- | --- | --- |
| No sample | 100 | *15.06 |
| HCl (5.7 N) | 48.9 | 0 |
| HCl (0.11 N) | 94.0 | 0 |
| Distilled water | 100 | 0 |

*Tuning capacity.

The following table B is to show the results obtained when the shield 15 has been removed from the detector head 16.

TABLE B

| Sample | Tuning current (μa.) | Capacitance for adjusting tuning (pf.) |
| --- | --- | --- |
| No sample | 100 | °15.66 |
| HCl (5.7 N) | 48 | −0.10 |
| HCl (0.11 N) | 93.6 | −0.52 |
| Distilled water | 100 | −0.30 |

*Tuning capacity.

It is obvious that the electric field-shield 15 acts as an important element in the apparatus.

The shape, construction and manner of use of the detector head 16 of the apparatus is not restricted to any special condition. The detector head 16 may be formed integral with the bottom of a container 25 or it may be formed as a probe-like body, such as shown in FIGS. 6 and 7. This detector head 16 may also be used for a pipe line through which flows an electrolyte.

The method and apparatus of the present invention may be applied, as it is, for neutralization titration. In FIG. 8, a stock solution of 0.2 normality of HCl is titrated with 2 normality of NaOH. As shown, the lowest point of the tuning current (Ig) indicates the neutralization of the solution.

What I claim is:

1. An apparatus for measuring the electrical conductivity of an electrolyte comprising a tuning circuit having an inductance coil and a condenser, said inductance coil having one end grounded and being placed with an end turn thereof near the electrolyte, a source of electric energy comprising an oscillator of constant high frequency and amplitude, means electrically connecting the inductance coil to said source of energy for setting up an alternating magnetic flux within the electrolyte, an electric field-shielding means interposed between said coil end and the electrolyte for nulling the capacitive coupling therebetween, said field-shielding means comprising a plurality of spaced conductors each having one end grounded and the other end open, said conductors being at right angles to the axis of the coil, and means electrically and operatively connecting said tuning circuit with an ampere meter for indicating the value of tuning current as a measure of the conductivity of the electrolyte.

2. An instrument for directly reading the concentration of an electrolyte comprising a tuning circuit having an inductance coil and a condenser, one of the coil ends of said inductance coil being grounded and being faced to the electrolyte, an electric field-shielding means interposed between said grounded coil end and the electrolyte, said electric field-shielding means being composed of a number of conductive wires of which one end grounded and the other end opened, respectively, so as not to form a closed circuit, said wires being arranged at right angles to the axis of the inductance coil, an oscillator of constant high frequency and amplitude electrically connected with the tuning circuit, a pickup circuit having a pickup coil arranged to be energized by the electric current in said tuning circuit, and means cooperating with said pickup circuit for indicating the concentration of said electrolyte in accordance with the power loss in the inductance coil when said inductance coil has been placed near the electrolyte.

3. An instrument for directly reading the concentration of an electrolyte comprising a serial L–C tuning circuit having an inductance coil and a condenser, one of the coil ends of said inductance coil being grounded and faced to the electrolyte, an electric field-shielding means interposed between said grounded coil end and the electrolyte, said electric field-shielding means being composed of a number of conductive wires of which one end grounded and the other end opened, respectively, so as not to form a closed circuit, said wires being arranged at right angle to the axis of said inductance coil, an oscillator of constant high frequency and amplitude electrically connected with the tuning circuit, a pickup circuit having a pickup coil arranged to be energized by the electric current in said tuning circuit, means for supplying the pickup current to an ampere meter through a rectifier, a circuit for developing an electric current of which phase is in oppotion and equal in magnitude to the electric current in said pickup coil, and metering means for indicating the difference of said two electric currents as a measure of concentration of the electrolyte.

References Cited
UNITED STATES PATENTS 3,152,303   10/1964   Lary et al. _____ 324—30

RUDOLPH V. ROLINEC, *Primary Examiner.*

WALTER L. CARLSON, *Examiner.*

C. F. ROBERTS, *Assistant Examiner.*